Sept. 20, 1955  H. A. BOURASSA ET AL  2,718,165
COMPOUND, DIFFERENTIAL BALL SCREW
Filed Aug. 23, 1954  2 Sheets-Sheet 1

*INVENTORS*
WALTER H. HOGAN
HUGUES A. BOURASSA
BY
*ATTORNEY*

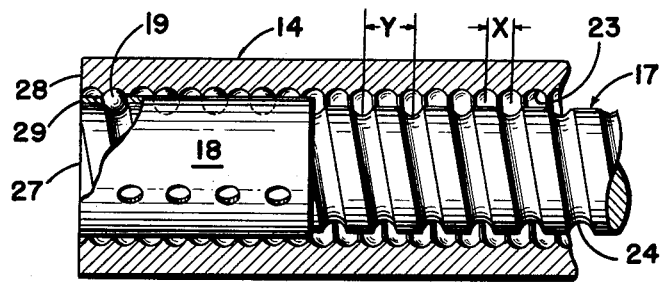
FIG. 3
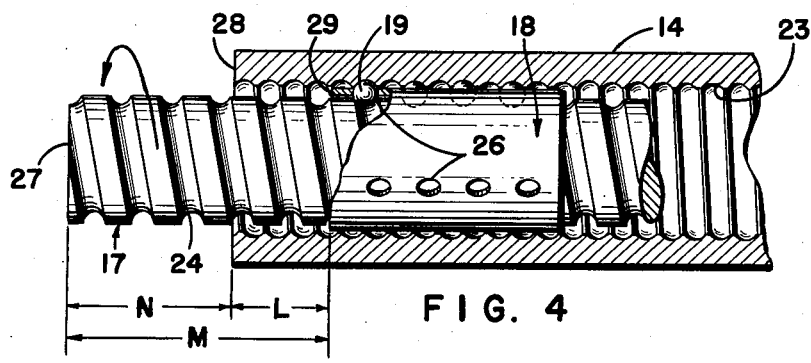
FIG. 4
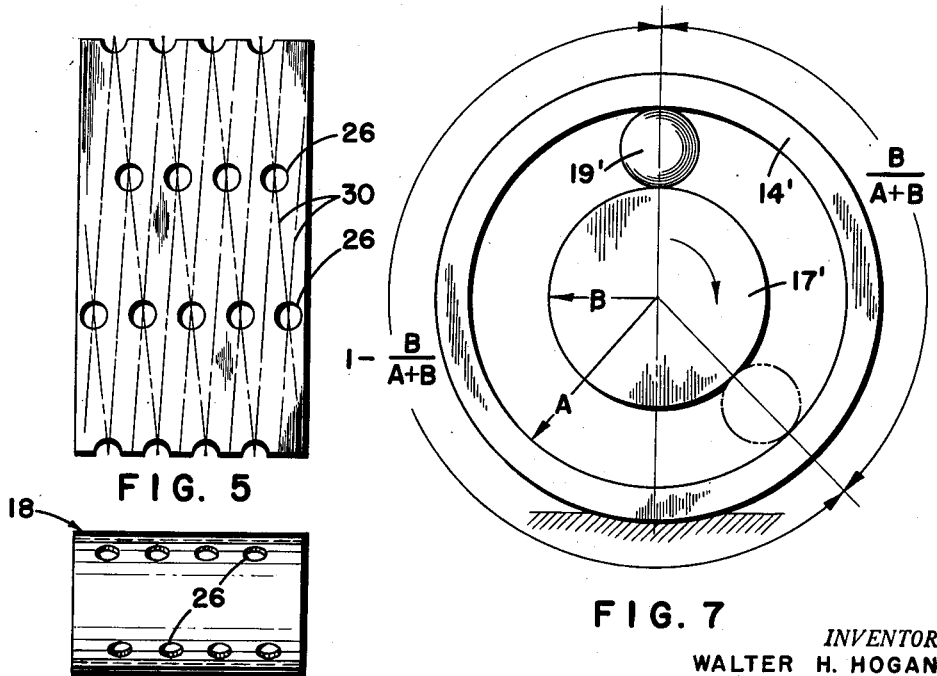
FIG. 5
FIG. 6
FIG. 7
INVENTORS
WALTER H. HOGAN
HUGUES A. BOURASSA
BY
ATTORNEY United States Patent Office 2,718,165
Patented Sept. 20, 1955

2,718,165

COMPOUND, DIFFERENTIAL BALL SCREW

Hugues A. Bourassa, Warrensville Heights, and Walter H. Hogan, Olmsted Falls, Ohio, assignors to The Cleveland Pneumatic Tool Company, Cleveland, Ohio, a corporation of Ohio Application August 23, 1954, Serial No. 451,334

10 Claims. (Cl. 81—33)

This invention relates generally to mechanical movements and more particularly to a mechanism which incorporates a ball screw of improved construction and characteristics.

In the past ball screws have been utilized for high efficiency conversion of rotational motion into linear motion wherein a mechanical advantage is provided. Generally the lead of the groove in the nut is equal to the lead of the groove in the screw with the result that one revolution of either the nut or screw will cause relative axial motion therebetween a distance equal to the lead of the grooves.

In a ball screw incorporating this invention the lead of the groove in the nut is not equal to the lead of the groove in the screw so any effective lead, less than the lead of the groove having the greatest lead may be achieved. This is particularly important when high mechanical advantages are desired since practical limitations have determined the maximum mechanical advantage available in ball screws wherein the groove of the nut is formed with a lead equal to the lead of the groove in the screw. This is because there is a minimum practical size for the balls and the lead of the helical grooves must be at least great enough to accommodate the balls and provide necessary strength in the ridges between the grooves. In a ball screw according to this invention it is possible to reduce the effective lead to substantially any desired value so that essentially unlimited mechanical advantages may be achieved. A mechanism according to this invention also includes means for limiting the movement of the balls relative to the nut so that the screw may be operated in a manner wherein relatively large effective leads may be provided when desired.

It is an important object of this invention to provide a ball screw wherein the lead of the groove in the nut is not equal to the lead of the groove in the screw.

It is another important object of this invention to provide a ball screw mechanism with a very small effective lead and very large mechanical advantage.

It is another object of this invention to provide a single ball screw mechanism which is capable of producing more than one lead and mechanical advantage.

It is still another object of this invention to provide a ball screw mechanism wherein fast operation is achieved until a predetermined load is supplied after which slow action and high mechanical advantages are automatically provided.

A still further object of this invention is to provide a clamping mechanism in which more than one mechanical advantage may be produced depending upon the particular needs of the device.

Further objects and advantages will appear from the following description and drawings, wherein:

Figure 3 is a side elevation in partial longitudinal section showing the various elements of a ball screw according to this invention;

Figure 4 is a side elevation partially in longitudinal section showing the position of the elements of the ball screw after the screw has been rotated relative to the nut;

Figure 5 shows the development of the sheet metal ball retainer;

Figure 6 is a view of the ball retainer in its cylindrical form;

Figure 7 is a schematic illustration of a system rotationally equivalent to the ball screw showing the relative rotational movement of the balls, screw and nut as the screw is rotated relative to the nut.

Figure 1:
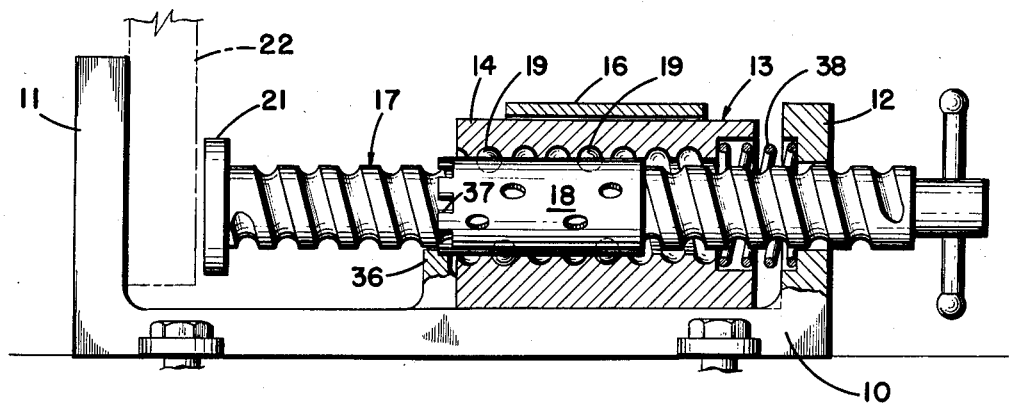
Figure 1 is a side elevation partially in longitudinal section showing a vise incorporating the ball screw according to this invention with the ball retainer locked relative to the nut.
Figure 2:
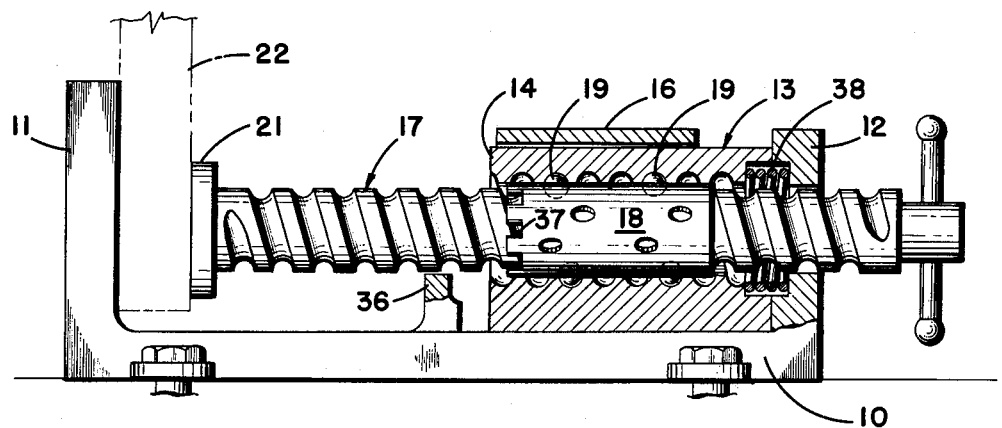
Figure 2 is a side elevation partially in longitudinal section showing the vise of Figure 1 with the elements in the position they assume when the vise is tightened.

A vise incorporating this invention is shown in Figures 1 and 2. This vise comprises a base 10 formed with a platen 11 at one end and an upwardly extending spring abutting portion 12 at the other end. A ball screw mechanism shown generally at 13 is provided with a nut 14 mounted on the base 10 by a yoke 16 for limited axial motion relative thereto. The ball screw mechanism 13 is also provided with a screw 17, a ball retainer 18 and a plurality of balls 19. The screw 17 is positioned in alignment with the platen 11 and is provided with an end member 21 adapted to engage and securely clamp a work piece 22 against the platen 11 when the screw is threaded toward the platen.

Reference should now be made to Figures 3 and 4 for a clear understanding of the structure and operation according to this invention. The nut 14 is formed with an internal helical groove 23 having a lead X and the screw 17 is formed with a helical groove 24 having a lead Y which is greater than the lead X. In the embodiment of this invention shown, the groove 24 is formed with a right hand helix and the groove 23 is formed with the left hand helix. A plurality of balls 19 are positioned in apertures 26 in the retainer 18 so that they are in engagement with the surfaces of the grooves 23 and 24 providing an interconnection between the nut and screw.

Because the grooves are formed with different leads, the balls can only be located at those points where the grooves intersect. If the grooves and balls are formed with sufficient accuracy, the balls will be properly positioned at the intersections by the grooves alone. However, the use of the ball retainer 18 to assist in the location of the balls is preferable, since it eliminates jamming of the balls which might occur if slight imperfections are present in the shape of the grooves or balls, and makes it possible to use larger tolerances in the manufacture of the device. It is therefore important to locate the apertures 26 relative to each other so that they will position all of the balls at these intersections. The ball retainer may be formed of flat sheet metal stock in which the apertures are punched. These apertures 26 are located at the intersections of lines 30 which correspond to the pitch lines of the grooves 23 and 24. After the apertures are formed the metal is bent into a cylinder shown in Figure 6 thereby forming the completed ball retainer 18.

As the screw is rotated relative to the nut, the balls roll along in the grooves causing relative axial motion between the various elements of the ball screw. Those familiar with the structure of the ball screw will understand that the balls move along the grooves as the screw and nut are rotated relative to each other and transform the rotational motion into relative axial motion. As the screw is rotated relative to the nut, the balls 19 roll along the groove 23 in the nut 14 thereby moving axially of the nut. At the same time, rotation between the nut and screw will cause the balls to roll along the groove 24 of the screw 17 causing relative axial motion between the ball and screw.

Reference shall now be made to Figure 7 wherein a system is illustrated which is equivalent to the ball screw insofar as relative rotational motions are concerned. In this system an outer ring member 14' corresponds to the nut 14, a center member 17' corresponds to the screw 17, and an intermediate member 19' corresponds to the balls 19. Assuming no slippage, if the members 14', 17' and 19' are in an initial position with intermediate member 19' located directly above the center member 17' and the center member 17' is rotated clockwise through one complete revolution relative to the ring member 14', the intermediate member 19' will move in a clockwise direction to the position shown in phantom. This motion of the intermediate member will be less than one-half a revolution, the end position of the intermediate member 19' within this range depending upon the relative sizes of the members. If the intermediate member 19' is small in relationship to the other members the final position will be only slightly less than one-half a revolution. It should be understood that even though the intermediate member 19' will rotate about its own axis, the revolutions herein referred to are revolutions around the axis of the center member 17'.

The motion of the intermediate member 19' relative to the ring member 14' is clockwise in this illustration and is equal to the expression $$\frac{B}{A+B}$$

where A is equal to the radius of the ring member 14' and B is equal to the radius of the center member 17'. The relative motion between the intermediate member 19' and the ring member 14', however, will be in the counter-clockwise direction and will therefore be equal to the expression $$1-\frac{B}{A+B}$$

Figure 8:
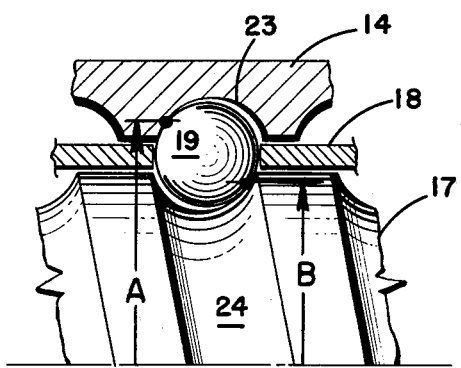
Figure 8 is an enlarged fragmentary section of a ball screw illustrating the determination of the effective radius of the screw and nut.

For determining the effective radius of the nut 14 and screw 17, reference should be made to Figure 8. When the screw is loaded axially of the nut the balls 19 engage the sides of the grooves 23 and 24 and the effective radius A and B of each of the two elements is the distance of this engagement from the axis.

Since the balls 19 revolve in one direction relative to the nut 14 and in the opposite direction relative to the screw 17 and since the direction of the helix of the groove 23 is opposite to the direction of the helix of the groove 24, the axial motion of the ball relative to both the nut 14 and the screw 17 will be in the same direction. This is clearly illustrated by comparing Figures 3 and 4 wherein the elements are shown in the positions they assume before and after a predetermined amount of relative rotational motion between the nut and the screw. In Figure 3 the end 27 of the screw is aligned with the end 28 of the nut and the end 29 of the ball retainer. After the screw is rotated as indicated by the arrow in Figure 4, the balls 19 and in turn the ball retainer 18 will have moved relative to the nut to the point where the end of the retainer 29 is spaced from the end of the nut a distance L and the end of the screw 27 is spaced from the end of the retainer 29 a distance M. The axial motion of the screw relative to the nut is represented by the distance N which an inspection will show to be equal to the distance M minus the distance L. The axial motion of the balls relative to the nut or the screw is determined by the relative rotational motion between the balls and each of the other elements times the lead of the groove of the particular element so the effective lead of the screw relative to the nut when the screw is turned through one revolution may be calculated by the following expression:

$$\text{Effective lead} = X\left(\frac{B}{A+B}\right) + Y\left[1-\left(\frac{B}{A+B}\right)\right]$$

where:

A = Effective radius of the nut
B = Effective radius of the screw
X = The lead of the nut
Y = The lead of the screw If the leads of the grooves are different either in magnitude or direction the effective lead will always be less than the lead of the groove having the greatest lead. When the direction of the helix of the groove in the nut is the same as the direction of the helix of the groove in the screw, both of the terms X and Y are positive and the effective lead will be equal to the sum of the factors in the above equation. However, in the illustration shown the helix of one groove is in a direction opposite to the helix of the other groove so one of the terms X or Y is considered negative and the effective lead is equal to the difference between the factors of the equation. It is apparent that by providing grooves formed with helices in opposite directions, the effective lead of the mechanism may be arranged to approach zero thus providing very large mechanical advantages even though the individual leads of the screw and the nut remain comparatively large.

The differential action between the screw and the nut takes place only when the balls are free to roll relative to both the screw and the nut and if the balls are retained against rotational motion relative to either the screw or the nut, rotation of the screw relative to the nut will result in axial motion therebetween at the rate of the lead of the other element.

In the vise shown in Figures 1 and 2, means are provided to restrain the ball retainer and in turn the balls from rotational motion relative to the nut under certain conditions and at this time rotation of the screw relative to the nut will cause the screw to move axially a full lead of the screw for each revolution. This results in fast action of the screw relative to the nut and is useful, when no load or a light load is present, in bringing the end member 21 into position against the work piece 22. In the vise the means for restraining the ball retainer 18 against motion relative to the nut 14 are arranged to automatically engage and disengage when a predetermined load is present. The stop 36 is mounted on the base 10 and is arranged to project into the notches 37 formed in the end of the ball retainer 18 when the nut is in the forwad position shown in Figure 1. At this time the ball retainer 18 is restrained against rotational motion relative to the base 10 and since the nut 14 is also restrained against rotational motion relative to the base 10 by the yoke 16 the ball retainer 18 cannot rotate relative to the nut 14. This is the position the various elements assume when no load or a small load is applied to the screw. After the end member 21 engages the work piece 22, further rotation of the screw in the forward direction causes the nut and ball retainer to move to the right compressing the spring 38 to the position shown in Figure 2 at which time the ball retainer 18 is disengaged from the stop 36 and free to rotate relative to both the screw and the nut. The effective lead of the ball screw is then reduced by the differential action and large axial forces may be applied to the end member 21 with relatively small rotational forces on the screw. When it is desired to release the work piece, the screw is retracted by rotating it in the opposite direction. As the load on the screw diminishes, the spring 38 again moves the nut 14 to the left until the parts assume the position shown in Figure 1 at which time the ball retainer 18 is restrained against rotational motion relative to the nut 14. Further rotation of the screw in the retracting direction causes the screw to move at the fast rate.

A ball screw mechanism according to this invention, therefore, provides two leads, one used for light loads in which fast action is accomplished and the other used at higher load levels wherein high mechanical advantages are needed. The mechanism is also arranged so that a rolling action is provided during the time when large forces are present on the screw so that high efficiency results at this time.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. An antifriction screw comprising cooperating screw and nut elements each formed with a helical groove with the lead of one groove greater than the lead of the other groove, a retainer position between said elements, and a plurality of antifriction members in said retainer engaging the walls of both of said grooves at intersections thereof whereby relative rotation between said elements causes said members to roll along the surface of each of said grooves and move axially relative to both of said elements, the effective lead of said antifriction screw being less than the lead of the groove having the greatest lead.

2. An antifriction screw comprising cooperating screw and nut elements each formed with a helical groove with the lead of one groove in a direction opposite to the lead of the other groove, an antifriction member engaging the walls of both of said grooves at an intersection thereof whereby relative rotation between said elements causes said member to roll along the surface of each of said grooves and move axially relative to both of said elements in the same direction, axial motion of one of said elements relative to the other of said elements being equal to the differential of said axial motions of said member relative to both of said elements.

3. An antifriction screw comprising cooperating screw and nut elements each formed with a helical groove with the lead of one groove in a direction opposite to the lead of the other groove, an antifriction member engaging the walls of both of said grooves at an intersection thereof, means engaging said antifriction members and retaining them in said intersections whereby relative rotation between said elements causes said member to roll along the surface of each of said grooves and move axially relative to both of said elements in the same direction, the axial motion of one of said elements relative to the other of said elements being equal to the differential of said axial motions of said member relative to both of said elements.

4. An antifriction screw comprising cooperating screw and nut elements each formed with a helical groove with a lead different than the lead of the other groove, antifriction members engaging the walls of both of said grooves at intersections thereof whereby relative rotation between said elements causes said members to roll along the surface of each of said grooves, the effective lead of said antifriction screw being less than the lead of the groove having the smallest lead.

5. An antifriction screw comprising cooperating screw and nut elements each formed with a helical groove with the lead of one groove different than the lead of the other groove, antifriction members engaging the walls of both of said grooves at intersections thereof, retaining means axially fixed relative to said antifriction members for positioning them at said intersections whereby relative rotation between said elements causes said members to roll along the surface of each of said grooves and move said retaining means axially relative to both of said elements, the axial motion between said retaining means and one of said elements being different than the axial motion between the retaining means and the other of said elements.

6. An antifriction screw comprising cooperating screw and nut elements each formed with a groove with the lead of one groove in a direction opposite to the lead of the other groove, antifriction members engaging the walls of both of said grooves at intersections thereof, retaining means axially fixed relative to said antifriction members for positioning said antifriction members at said intersections whereby relative rotation between said elements causes said members to roll along the surface of each of said grooves and move said retaining means axially relative to both of said members, the axial motion between said retaining means and both of said elements being in the same direction.

7. A ball screw comprising cooperating screw and nut members each formed with a helical groove with the lead of one groove in a direction opposite to the lead of the other groove, a ball retainer, balls in said ball retainer engaging the walls of both of said grooves at intersections thereof, and stop means engageable with said retainer for restraining said retainer and balls against rotation relative to one of said members, whereby said balls roll along the surface of each of said grooves and move axially relative to said screw and nut in the same direction upon relative rotational motion between said nut and screw members when said retainer is disengaged from said stop means, said axial motion of the nut member relative to said screw member being equal to the differential of the axial motion of the ball relative to said nut and screw members.

8. A ball screw comprising cooperating screw and nut members each formed with a helical groove with the lead of one groove greater than and opposite to the lead of the other groove, a ball retainer, balls in said ball retainer engaging the walls of both of said grooves at intersections thereof, and stop means engageable with said retainer for restraining said retainer and balls against rotation relative to one of said members, whereby said balls roll along the surface of each of said grooves and move axially relative to said screw and nut in the same direction upon relative rotational motion between said nut and screw members when said retainer is disengaged from said stop means, said axial motion of the nut member relative to said screw member being equal to the differential of the axial motion of the ball relative to said nut and screw members.

9. A motion transmitting device comprising a base, cooperating nut and screw members each formed with a helical groove with the lead of one groove greater than and opposite to the lead of the other groove, one of said members being mounted on said base for limited motion between a first and a second position, resilient means urging said one member toward said first position, a ball retainer position between said members, balls in said ball retainer engaging the walls of both of said grooves, and stop means engaging said retainer when said one member is in said first position and restraining said retainer and balls against rotation relative to said one member, said stop means being disengaged from said retainer when said one member is spaced from said first position, whereby said balls roll along the surface of each of said grooves and move axially relative to said members in the same direction upon relative rotational motion between said members when said one member is spaced from said first position, the axial motion of the nut relative to said screw being equal to the differential of the axial motion of the ball relative to said nut and screw.

10. A vise comprising a base formed with a laterally extending platen, a nut formed with a helical internal groove and mounted on said base for limited axial motion between a first and a second position, resilient means urging said nut toward said first position, a screw extending through said nut and aligned with said platen for clamping a work piece thereagainst, said screw being formed with an external helical groove, a ball retainer position between said nut and screw, balls in said ball retainer engaging the walls of both of said grooves, and stop means engaging said retainer when said nut is in said first position and restraining said retainer and balls against rotation relative to said nut whereby rotation between said screw and nut with said balls restrained against rotation relative to said nut moves said screw axially at a rate equal to the lead of the groove in said screw, said stop means being disengaged from said retainer when said nut is spaced from said first position, the direction of the helix of the groove in the nut being opposite to the direction of the helix of the groove on the screw whereby said balls roll along the surface of each of said grooves and move axially relative to both said screw and nut in the same direction upon relative rotational motion between said nut and screw when said nut is spaced from said first position, the axial motion of the nut relative to said screw being equal to the differential of said axial motion of the ball relative to said nut and screw.

References Cited in the file of this patent

UNITED STATES PATENTS

| | | |
|---|---|---|
| 975,591 | Whitney | Nov. 15, 1910 |
| 1,389,565 | Jensen | Aug. 30, 1921 |
| 2,683,379 | Strandgren | July 13, 1954 |